Sept. 2, 1958 R. W. HART 2,850,625

SELECTIVE RECEIVER

Filed Oct. 2, 1953 2 Sheets-Sheet 1

INVENTOR
ROBERT W. HART

BY W. R. Maltby
D. E. Snyder
ATTORNEYS

Sept. 2, 1958 R. W. HART 2,850,625

SELECTIVE RECEIVER

Filed Oct. 2, 1953 2 Sheets-Sheet 2

INVENTOR
ROBERT W. HART
BY W. R. Maltby
D. E. Snyder
ATTORNEYS

United States Patent Office 2,850,625

Patented Sept. 2, 1958

2,850,625

SELECTIVE RECEIVER

Robert W. Hart, Lynn, Mass.

Application October 2, 1953, Serial No. 383,943

2 Claims. (Cl. 250—20)

(Granted under Title 35, U. S. Code (1952), sec. 266)

The invention described herein may be manufactured and used by or for the Government of the United States of America for governmental purposes without the payment of any royalties thereon or therefor.

The present invention relates generally to communication systems and, more particularly, to selective receivers for use in such systems.

In copending application, Serial No. 224,633, filed May 4, 1951, now U. S. Patent No. 2,713,118, granted July 12, 1955, in the name of Robert W. Hart, there is disclosed a receiver utilizing a combination of relatively wide band amplifiers, mixing circuits and frequency multipliers, that possesses a degree of signal selectivity superior to that heretofore obtainable with conventional receivers depending upon sharply tuned circuits. Narrow band operation of ±50 cycles is successfully achieved in this system, with I. F. stages having conventional pass band limits of ±400 cycles, by subjecting the signals appearing in the output circuit of a first I. F. amplifier to a second heterodyne action, thereby reducing the frequencies of these signals while maintaining their absolute band spread, and thereafter, successively multiplying the frequencies of these signals until they again occupy a signal band re-centered about the mid-band frequency of the I. F. amplifier. As a result of this sequence of operations, the band spread of the signals passed by the first I. F. amplifier is considerably expanded so that a majority of the interfering signals initially appearing in the I. F. amplifier's output, because of its relatively broad band characteristic, are now sufficiently displaced from the mid-band frequency so that a second I. F. amplifier, tuned to the same mid-band frequency and designed with the same pass band, can effectively discriminate against these same signals.

Because of the improved selectivity of this receiving arrangement, it is necessary that both the frequency of the tracking oscillator, which produces the original I. F. signals, and the frequency of the heterodyne oscillator, which reduces these signals to a lower part of the frequency spectrum, be maintained as nearly constant as possible. Any drift in either of these oscillators is subsequently exaggerated by the successive frequency multipliers, so that the final signals may possibly be returned to a portion of the frequency spectrum completely outside of the pass band limits of the second I. F. amplifier.

The most critical portion of this system is the circuit from the first mixer up to the frequency multipliers. If the signal input to these multipliers is stable, the selectivity of the receiver as a whole may be made as high as necessary. No great difficulty is encountered in achieving the necessary frequency stability in the case of the heterodyne oscillator, since this oscillator is assigned a constant frequency and, therefore, may be designed to take advantage of the stability offered by crystal controlled circuits. The tracking oscillator, however, which is responsible for the initial production of the I. F. signals, must, in all applications except those in which the receiver is to receive fixed frequencies, be capable of generating a band of frequencies in order to track with the tuning of the R. F. amplifier. Therefore, this oscillator must be of the L. C. type and subject, as a consequence, to the inherent variations in frequency found in such a design. To minimize such variations as may result from the use of such an oscillator, the above-mentioned copending application suggests that both the crystal and the L. C. oscillators be located in a common enclosure and that temperature control equipment be associated therewith, so that, when and if the frequencies of these oscillators change, their variations will be proportional and neutralize each other by virtue of the successive heterodyne actions.

The present invention is directed to an improvement in this system whereby the frequency stability of the receiver is further improved by means of additional compensating and restoring circuits.

It is therefore a primary object of the present invention to provide a receiver of the heterodyne type in which tendencies toward slight frequency variations originating in the tracking oscillator are prevented from influencing the frequency of the I. F. signals.

A secondary object of the invention is to provide a highly selective receiver in which the frequency stability of the tracking oscillator is improved.

Another object of the invention resides in the provision of designing a tracking oscillator capable of demonstrating a frequency stability commensurate to that previously obtainable only with crystal oscillators.

A still further object of the invention is to provide a heterodyne receiver in which frequency variations in the operation of the heterodyne oscillator are minimized.

Briefly, and in general terms, the foregoing objects are achieved according to the present invention by utilizing as the second heterodyne signal in the receiving arrangement of the above application a signal obtained by mixing the output of a master crystal oscillator with a monitor L. C. oscillator, the latter being designed with the same circuit as that employed in the tracking L. C. oscillator but tuned initially to a predetermined frequency slightly removed from the band of frequencies through which the latter oscillator works.

By design, both L. C. oscillators are adapted to be influenced to the same degree by temperature and power supply variations. These variations are held to a minimum by disposing both oscillators in temperature controlled enclosures and by employing regulated voltage power supplies. Thus, if the tracking oscillator increases in frequency by one hundred cycles, for example, the accompanying one hundred-cycle increase in the monitor oscillator substantially compensates for this variation in the second mixing circuit of the receiver so that the input signal frequency to the multipliers remains constant. While this arrangement contributes to increased frequency stabilization as far as the signal from the output of the second mixer is concerned, which signal is fed to the multipliers and the second intermediate frequency amplifier, it does not give the high signal selectivity sought nor permit the receiver to be preset with a high degree of precision, since both of these factors require high stability of the tracking oscillator's frequency.

To achieve high stability in the frequency of the tracking oscillator, this oscillator and the L. C. monitor oscillator are designed so that their frequencies vary to the same degree in response to the application of a compensating voltage to the regulated power supply providing their operating potentials. This compensating voltage, which is variable in magnitude and proportional to the frequency deviation of the L. C. monitor oscillator from the master crystal oscillator, is derived from a circuit tuned to a frequency slightly above that of the second heterodyne signal, produced by the interaction of these oscillators. Normally, this signal falls on the straight-line portion of the resonance curve of the above circuit. Thus, an increase in the frequency of this signal results in a trend towards resonance and a higher control voltage being applied to the compensating circuit, whereas a decrease in the frequency of the signal results in an opposite effect. It will thus be seen that the above compensating feature functions to give the L. C. monitor oscillator a frequency stability equivalent to that of its companion crystal oscillator. Furthermore, since the tracking oscillator is designed to be influenced by power supply voltages exactly as the L. C. monitor oscillator, the former oscillator will contain an adjustable frequency component having a degree of stability equivalent to that of a crystal oscillator, insofar as temperature and power supply voltage are concerned.

To facilitate the following explanation of the operation of the invention, certain frequencies have been assigned to the various amplifying and oscillating circuits. It is to be understood that these values are included by way of example only and the invention is not to be limited in any respect by this selection of frequencies.

Other objects and many of the attendant advantages of this invention will be readily appreciated as the same becomes better understood by reference to the following detailed description when considered in connection with the accompanying drawings wherein.

Figure 1:
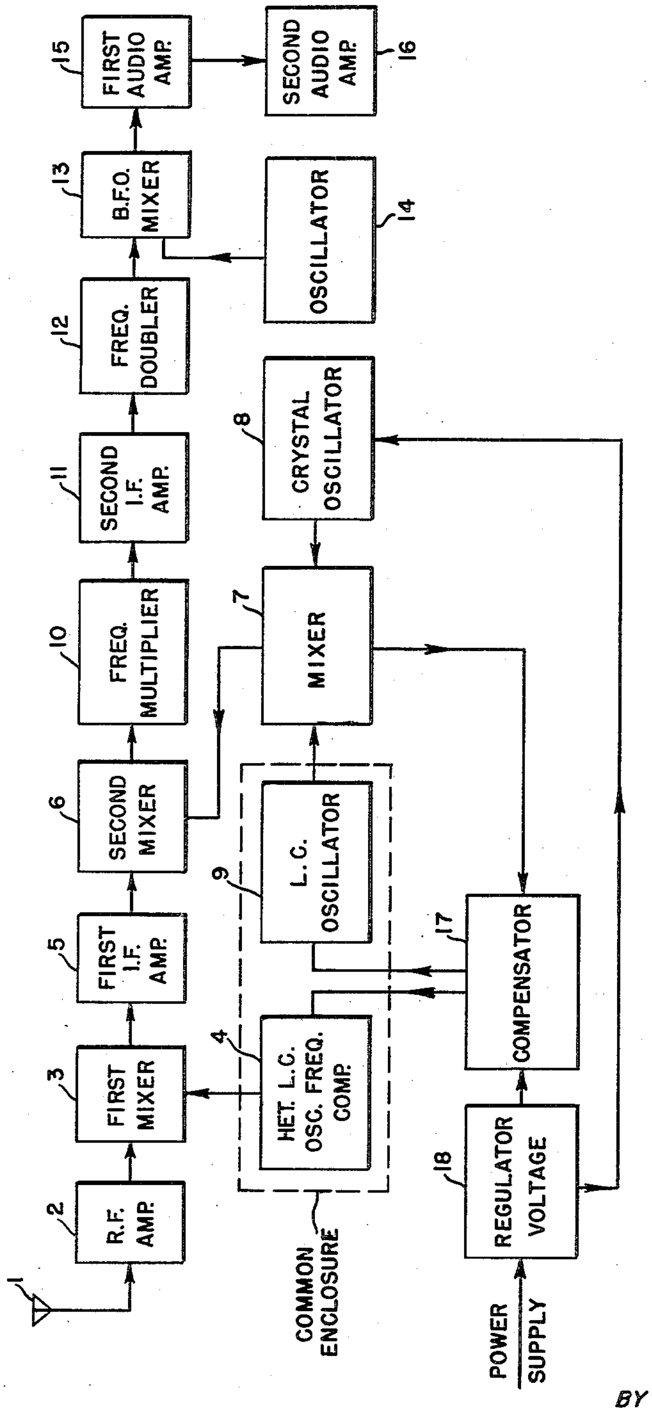
Fig. 1 is a block diagram of a preferred embodiment of the invention.

Referring now to Fig. 1, radio frequency amplifier 2 is tuned to receive signals in the 3,000 to 4,000 kc. range arriving at antenna 1. Tracking oscillator 4 is of the L. C. type and designed to provide extremely stable oscillations in the 3464 kc. to 4464 kc. band. The tuning of this oscillator is tracked with that of the R. F. amplifier and the outputs of both are applied to a first mixer 3, from which a resultant difference signal of 464 kc. is derived and applied in turn to a first I. F. amplifier 5. This amplifier is of conventional design and tuned to a peak at 464 kc., with its pass-band defined by 464 kc. ±.4 kc. The output of this first I. F. amplifier is coupled to a second mixer 6 in which the I. F. signals are further heterodyned with a locally generated signal obtained from mixer 7. The function of mixer 7 is essentially the same as that of the second crystal-controlled oscillator in applicant's copending application, Serial No. 224,633, namely, to provide a second heterodyne signal for reducing the frequency of the I. F. signals to a lower part of the frequency spectrum without disturbing their absolute band spread. The input to mixer 7 is composed of a highly stable frequency signal of 4122 kc. originating at master crystal oscillator 8 and the output of a second L. C. oscillator 9 tuned to a frequency of 4528 kc., a value slightly outside the frequency range assigned to tracking oscillator 4. Normally, therefore, the signal fed to the second mixer 6 is 406 kc. and the reaction of this signal with the 464 kc. I. F. signal produces a 58 kc. signal at the input terminals of frequency multiplier 10. The mid-band I. F. signal is thus reduced in frequency by a factor of eight, which reduction corresponds to that obtained in the above-mentioned copending application. It will be appreciated, however, that the frequency to which the monitor oscillator is initially preset may correspond to the mid-band frequency of the tracking oscillator, provided suitable shielding is employed at the receiver to prevent the production of image signals from the reaction of the monitor with the incoming received signals.

To insure the stability of this 58 kc. signal, a requirement that must be satisfied because of the subsequent frequency multiplications, L. C. oscillators 4 and 9 are disposed within a common enclosure that has its temperature adequately controlled by any well-known regulating equipment. These oscillators are furnished with operating potentials from a common regulated voltage supply, and since they are both designed with the same circuit and operate in approximately the same frequency range, within prescribed limits, both oscillators will experience similar simultaneous changes in frequency whenever external or internal conditions disturb them. Consequently, if the frequency of the tracking oscillator 4 changes and increases, for example, to 3464.1 kc., the same one hundred-cycle change will be reflected in the output of oscillator 9. The I. F. signal from amplifier 5 increases to 464.1 kc., while the output signal from mixer 7 assumes a value of 406.1 kc. These frequency variations consequently neutralize each other in the second mixer 6 and a constant 58 kc. signal appears in the output of second mixer 6. Hence, the subsequent frequency multiplications will invariably re-center the signals about the mid-band frequency of the I. F. amplifier. To accomplish this last result, three frequency doubling circuits may be cascaded to provide a multiplying factor of eight.

Besides compensating for slight frequency variations in the operation of the tracking oscillator, the present invention incorporates an element of automatic frequency control whereby the frequency of this oscillator is restored to its correct value in the event of any departure. This control is obtained by compensating the regulated voltage supplying the plate circuits of oscillators 4 and 9 in such a manner that deviations of the latter oscillator from its normal operating frequency of 4528 kc. will be accompanied by a change in the plate voltage of this oscillator chosen in magnitude and direction to bring the frequency of this oscillator back to the above value. The same type of compensation utilized in conjunction with the operation of oscillator 9 is also introduced into the plate circuit of the first heterodyne oscillator 4, inasmuch as this oscillator experiences the same type of frequency departure.

Figure 2:
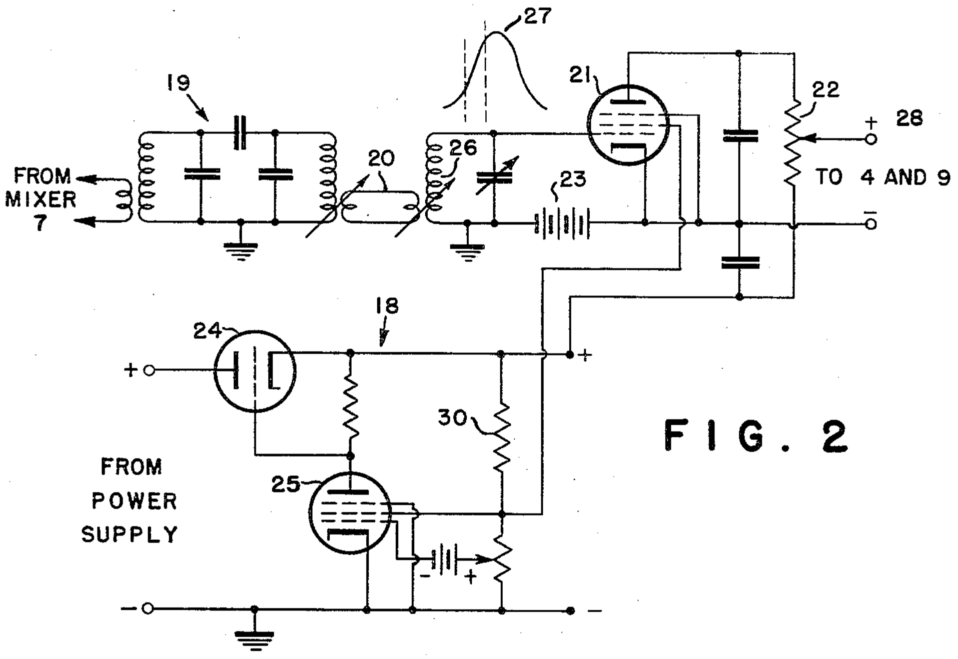
Fig. 2 is a schematic diagram of the voltage regulator and frequency compensator circuits utilized in the system of Fig. 1.

The complete circuit of voltage regulator 18 and voltage compensator 17 is shown in Fig. 2. In this figure a portion of the output from the 406 kc. mixer 7 is fed via transformer action to preselector 19. This preselector is critically turned to a frequency in the order of 406 kc. and its output is fed via an adjustable coupler 20 to the input circuit of compensator control tube 21. In the grid-cathode circuit of the latter tube is a bias battery 23 and a tuned circuit 26, made up of the parallel combination of an inductor and capacitor. The tuning of circuit 26 is adjusted so that normal variations in the frequency of the 406 kc. signal, brought about by the frequency drift of the L. C. oscillator 9, fall within the substantially linear portion of the resonance curve 27 of the tuned circuit. Thus, if L. C. oscillator 9 departs from its preset frequency of 4528 kc. and, for example, decreases in value, the accompanying decrease in the frequency of the beat signal from mixer 7 results in a decreased voltage across tuned network 26 and an increase in the voltage across terminals 28. Since this voltage provides the operating plate potential for L. C. oscillators 9 and 4, and since both of these oscillators are designed so that increases in plate voltage results in equal increases in frequency of oscillation, these oscillators are raised in frequency to correct for the assumed frequency departure. In a like manner, if L. C. oscillator 9 increases in frequency, the compensated voltage taken from terminals 28 possesses less magnitude and the frequencies of the above two L. C. oscillators are lowered to their proper values. The degree of power supply voltage compensation in this circuit may be effectively controlled by adjusting the tap on plate resistor 22 and the direction of such compensation may be changed by tuning network 26 in the grid-cathode circuit of pentode 21.

The operating potential for pentode 21 and crystal oscillator 8 is obtained from a highly regulated voltage supply generally identified by reference character 18. This portion of the system is of conventional design. As is well known in the art, such a voltage regulator is comprised of a variable impedance triode 24 in the positive supply conductor and an amplifying tube effectively connected across the load resistor 30 with its grid bias determined by the voltage drop across a portion of this resistor and its plate directly connected to the grid of the series tube.

The above automatic frequency control technique, it would be pointed out, may be utilized in any frequency control system to provide a variable frequency oscillator with a frequency stability comparable to that of a crystal controlled oscillator. The only requirements to be satisfied, as noted above, are that both oscillators, the variable L. C. oscillator and the fixed L. C. oscillator, elements 4 and 9, respectively, in the present system, possess similar frequency-versus-temperature and frequency-versus-operating potential characteristics, that both oscillators be tuned to substantially the same portion of the frequency spectrum, and that both be disposed within temperature regulated enclosures. If these conditions are satisfied, then both oscillators will behave as crystal controlled oscillators within prescribed limits. If it is desired, the fixed L. C. oscillator may be initially preset to a frequency value corresponding to the mid-band frequency of the tracking or variable oscillator. With such a setting, the compensation is somewhat simplified since the effects of nonlinearity of the frequency-versus-operating potential characteristic are minimized.

Although the remainder of the receiving circuit shown in Fig. 1 corresponds in all essential details to that disclosed in copending application, Serial No. 224,633, a brief review of the operation of this portion of the receiver will now be given. After the frequency multiplication in the three cascaded frequency doubling circuits, the signals are fed to a second I. F. amplifier 11 whose band-pass characteristic is similar to that of the first I. F. amplifier 5. Thus, an unwanted signal which passed through the I. F. amplifier 5 of, for example, 464.1 kc. is beat back to 58.1 kc. by the second heterodyne action in mixer 6 and then multiplied to 116.2 kc., 232.4 kc. and 464.8 kc. Consequently, the unwanted signal which originally was .1 kc. off the mid-band I. F. frequency as it passed through the first I. F. amplifier 5 is now .8 kc. off the same frequency and, therefore, cannot pass through the second I. F. amplifier 11.

To eliminate spurious injection from the various oscillators, it is desirable to double the frequency of the output signal from the second I. F. amplifier to 928 kc. This permits utilization of a beat frequency oscillator 14 of 928.8 kc., a frequency which is outside of the range of all the tuned circuits in the receiver. After the final heterodyning action in mixer 13, the intelligence signals, which are now of audio frequency, are fed to amplifiers 15 and 16 and then to the desired utilization apparatus.

Obviously, many modifications and variations of the present invention are possible in the light of the above teachings. It is therefore to be understood that within the scope of the appended claims the invention may be practiced otherwise than as specifically described.

What is claimed is:

1. In a radio receiver of the heterodyne type the combination of an L. C. tracking oscillator capable of generating a predetermined band of frequencies, said oscillator being subject to a certain amount of frequency instability because of the nature of its frequency determining components, means for heterodyning received radio frequency signals with the output of said oscillator whereby first intermediate frequency signals are produced, a second L. C. oscillator, said second oscillator being designed with the same circuit as said L. C. tracking oscillator and subject also to a certain amount of frequency instability because of the nature of its frequency determining components, said second oscillator being fixedly tuned to a predetermined frequency slightly outside the frequency band generated by said first oscillator, a crystal controlled oscillator, means for heterodyning the output of said crystal controlled oscillator with the output of said second oscillator thereby to develop a control signal whose frequency corresponds to the difference frequency of said second oscillator and said crystal controlled oscillator, means for subjecting said intermediate frequency signals to a further heterodyne action with said control signal whereby second intermediate frequency signals are produced, means for developing an error signal whose amplitude is dependent upon the amount by which the frequency of said control signal departs from a predetermined value, and means for applying said error signal to said tracking and second L. C. oscillators, thereby to change their frequencies by the same amount and in the same direction and thus compensate for any frequency instability in the oscillators.

2. In a radio receiver of the heterodyne type the combination of an L. C. tracking oscillator capable of generating a predetermined band of frequencies, said oscillator being subject to a certain amount of frequency instability because of the nature of its frequency determining components, means for heterodyning received radio frequency signals with the output of said oscillator whereby first intermediate frequency signals are produced, a second L. C. oscillator, said second oscillator being designed with the same circuit as said L. C. tracking oscillator and subject also to a certain amount of frequency instability because of the nature of its frequency determining component, said second oscillator being fixedly tuned to the mid-band frequency of said frequency ban generated by said first oscillator, a crystal controlled oscillator, means for heterodyning the output of said crystal controlled oscillator with the output of said second oscillator thereby to develop a control signal whose frequency corresponds to the difference frequency of said second oscillator and said crystal controlled oscillator, means for subjecting said intermediate frequency signals to a further heterodyne action with said control signal whereby second intermediate frequency signals are produced, means for developing an error voltage whose amplitude varies as the frequency of said control signal varies from a predetermined fixed frequency, and means for applying said error voltage to said first and second L. C. oscillators, thereby to restore their frequencies to their proper values in the event of any drifting caused by their inherent frequency instability.

References Cited in the file of this patent

UNITED STATES PATENTS

| | | |
|---|---|---|
| 1,850,580 | Coram | Mar. 22, 1932 |
| 1,950,535 | Young | Mar. 13, 1934 |
| 2,032,675 | Waller | Mar. 3, 1936 |
| 2,058,411 | Carlson | Oct. 27, 1936 |
| 2,082,767 | Koch | June 1, 1937 |
| 2,099,156 | Wheeler | Nov. 16, 1937 |
| 2,166,274 | Whitelock | July 18, 1939 |
| 2,245,385 | Carlson | June 10, 1941 |
| 2,282,974 | Koch | May 12, 1942 |
| 2,306,687 | Cox | Dec. 29, 1942 |
| 2,312,374 | Unger | Mar. 2, 1943 |
| 2,501,591 | Bach | Mar. 21, 1950 |
| 2,509,963 | Collins | May 30, 1950 |